(12) United States Patent
Cui et al.

(10) Patent No.: US 11,626,613 B2
(45) Date of Patent: Apr. 11, 2023

(54) BATTERY CELL, ELECTROCHEMICAL DEVICE AND MANUFACTURING METHOD THEREOF

(71) Applicant: Ningde Amperex Technology Limited, Fujian (CN)

(72) Inventors: Houlei Cui, Fujian (CN); Zhiwen Xiao, Fujian (CN); Weimin Jiao, Fujian (CN); Guoluo Lin, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 119 days.

(21) Appl. No.: 16/203,656

(22) Filed: Nov. 29, 2018

(65) Prior Publication Data
US 2019/0165409 A1    May 30, 2019

(30) Foreign Application Priority Data
Nov. 30, 2017    (CN) .......................... 201711238537.1

(51) Int. Cl.
*H01M 10/052*    (2010.01)
*H01M 10/0585*    (2010.01)
(Continued)

(52) U.S. Cl.
CPC ..... *H01M 10/052* (2013.01); *H01M 10/0431* (2013.01); *H01M 10/0585* (2013.01); *H01M 10/0587* (2013.01)

(58) Field of Classification Search
CPC ........ H01M 10/052; H01M 2/08; H01M 2/26; H01M 10/0431; H01M 1/0585; H01M 10/0587
See application file for complete search history.

(56) References Cited

U.S. PATENT DOCUMENTS 6,500,559 B2 * 12/2002 Hofmeister ............. B32B 27/34
428/474.4
9,871,243 B2 * 1/2018 Minagata .............. H01M 50/54
(Continued)

FOREIGN PATENT DOCUMENTS

CN    102104128 A    6/2011
CN    203377299 U    1/2014
(Continued)

OTHER PUBLICATIONS

Office Action, CN201711238537.1, dated Apr. 29, 2020, 7 pgs.
Office Action, CN201711238537.1, dated Mar. 4, 2021, 8 pgs.
Office Action, CN201711238537.1, dated Jan. 26, 2022, 5 pgs.

*Primary Examiner* — Helen Oi K Conley
(74) *Attorney, Agent, or Firm* — Morgan, Lewis & Bockius LLP (57) ABSTRACT

The present application provides a battery cell including a first electrode, a second electrode, and a separator disposed therebetween, wherein the separator comprises an extension portion beyond the first electrode and the second electrode at an end portion of the battery cell. The battery cell further includes an adhesive layer including a body and a connecting portion extending from the body. The body is adhered to the extension portion, and the connecting portion is adhered to the extension portion. It is an object of the present application to provide a battery cell that effectively eliminates invalidation resulted from short circuit caused by the separator shrinkage. The present application further provides an electrochemical device and a method of manufacturing thereof.

13 Claims, 7 Drawing Sheets

(51) Int. Cl.
*H01M 10/0587* (2010.01)
*H01M 10/04* (2006.01)

(56) References Cited

U.S. PATENT DOCUMENTS

| | | | |
|---|---|---|---|
| 2003/0104273 A1 | 6/2003 | Lee et al. | |
| 2008/0233474 A1* | 9/2008 | Son | H01M 50/147 |
| | | | 429/129 |
| 2009/0155631 A1* | 6/2009 | Baek | H01M 10/0436 |
| | | | 429/7 |
| 2011/0151307 A1 | 6/2011 | Hwang et al. | |
| 2016/0043374 A1* | 2/2016 | Seong | H01M 50/463 |
| | | | 429/143 |
| 2017/0018753 A1* | 1/2017 | Minagata | H01M 2/266 |
| 2018/0233771 A1* | 8/2018 | Miyazaki | H01M 50/557 |

FOREIGN PATENT DOCUMENTS

| | | | |
|---|---|---|---|
| CN | 203690386 U | 7/2014 | |
| CN | 104685691 A | 6/2015 | |
| CN | 105355956 A | 2/2016 | |
| CN | 105374957 A | 3/2016 | |
| JP | 2010199281 A | 9/2010 | |
| JP | 2014139885 * | 7/2014 | H01M 10/04 |

\* cited by examiner

BATTERY CELL, ELECTROCHEMICAL DEVICE AND MANUFACTURING METHOD THEREOF

CROSS-REFERENCE TO RELATED APPLICATION

This application claims priority to and benefits of Chinese Patent Application Serial No. 201711238537.1, filed with the China National Intellectual Property Administration on Nov. 30, 2017, and the entire content of which is incorporated herein by reference.

FIELD

The present application relates to the field of battery, in particular, to a battery cell, an electrochemical device and a manufacturing method thereof.

BACKGROUND

The secondary battery has the advantages of high energy density, long cycle life, high energy efficiency, small self-discharge, no memory effect, and free from contamination. The solution to the safety problem of secondary batteries is a prerequisite for the widespread use of secondary batteries. At present, there are still certain safety risks in secondary batteries, and the safety problem of secondary batteries has become a key factor for restricting its further development.

Separator shrinkage is an important factor that restricts the battery drop performance due to its easy occurrence and short circuit hazard. According to the general secondary battery structure, the battery cell mainly includes a positive electrode, a separator, and a negative electrode. During the falling process, the edge of the separator is wrinkled and deformed, and shrinks into the gap between the positive and negative electrodes, thereby causing a short circuit between the positive and negative electrodes.

SUMMARY

In view of the problems existing in the prior art, it is an object of the present application to provide a battery cell that effectively eliminates invalidation resulted from short circuit caused by the separator shrinkage.

The present application provides a battery cell including a first electrode, a second electrode and a separator therebetween. Wherein the separator includes an extension portion beyond the first electrode and the second electrode at an end portion of the battery cell. The battery cell further includes an adhesive layer including a body and a connection portion extending from the body. Wherein the body is adhered to the extension portion, and the connecting portion is adhered to the extension portion.

According to an embodiment of the present application, the adhesive layer includes a plurality of adhesive layer units positioned at interval on the end portion.

According to an embodiment of the present application, the adhesive layer includes at least one of ethylene-vinyl acetate copolymer, random polyolefin, polyamide, polyurethane, polyethylene, polyacrylic acid, organic silicone, polyvinyl alcohol, epoxy resin, styrene butadiene rubber.

According to an embodiment of the present application, the adhesive layer has a thickness of 10 to 300 um.

According to an embodiment of the present application, the adhesive layer has a thickness of 50 to 150 um.

According to an embodiment of the present application, a dimension of the adhesive layer is equal to or less than an end face dimension of the battery cell.

According to an embodiment of the present application, the adhesive layer has a porous structure inside.

According to an embodiment of the present application, the battery cell may further include a substrate connected to the body of the adhesive layer.

The present application further provides an electrochemical device including: a housing; an electrolyte contained in the housing; and the battery cell mentioned above arranged in the housing.

The present application further provides a method of manufacturing a electrochemical device including a housing and a battery cell including an end portion and an adhesive layer, a separator having an extension portion beyond the first electrode and the second electrode at an end portion of the battery cell, the adhesive layer is arranged on the extension portion, the method including the steps of:
arranging the adhesive layer on the end portion;
placing the battery cell in the housing;
heating the electrochemical device.

According to an embodiment of the present application, the heating temperature is 50 to 100° C.

According to an embodiment of the present application, the adhesive layer is heated to increase the surface adhesion of the adhesive layer before the step of arranging the adhesive layer on the end portion.

The present application has the advantages as follows:

In the present application, the extension portion of the separator is adhered by the body and the connecting portion of the adhesive layer, so that the movement of the extension portion of the separator is restricted by the adhesive force of the adhesive layer. Therefore, the separator is prevented from shrinking into the gap between the first and the second electrodes, so that the short circuits caused by contacts between the first and the second electrodes may be avoided.

Since the body of the adhesive layer remains at the end portion of the battery cell, the integrity of the battery cell is enhanced while effectively restricting the extension portion of the separator, and decompaction between the electrodes is reduced.

DETAILED DESCRIPTION

The technical solutions in the present application will be described in detail below with reference to the drawings.

Embodiments of the present application are described herein. It is to be understood, however, that the disclosed embodiments are merely examples and other embodiments may take various and alternative forms. Herein, the wordings of "first . . . " refers to "negative", and "second" refers to "positive" in the following schematic embodiments. For example, "a first electrode" corresponds to "a negative electrode", and "a second electrode" corresponds to "a positive electrode".

Further, it should be understood that "first" and "second" may refer to "positive" and "negative" respectively in alternative other embodiments.

Figure 1:
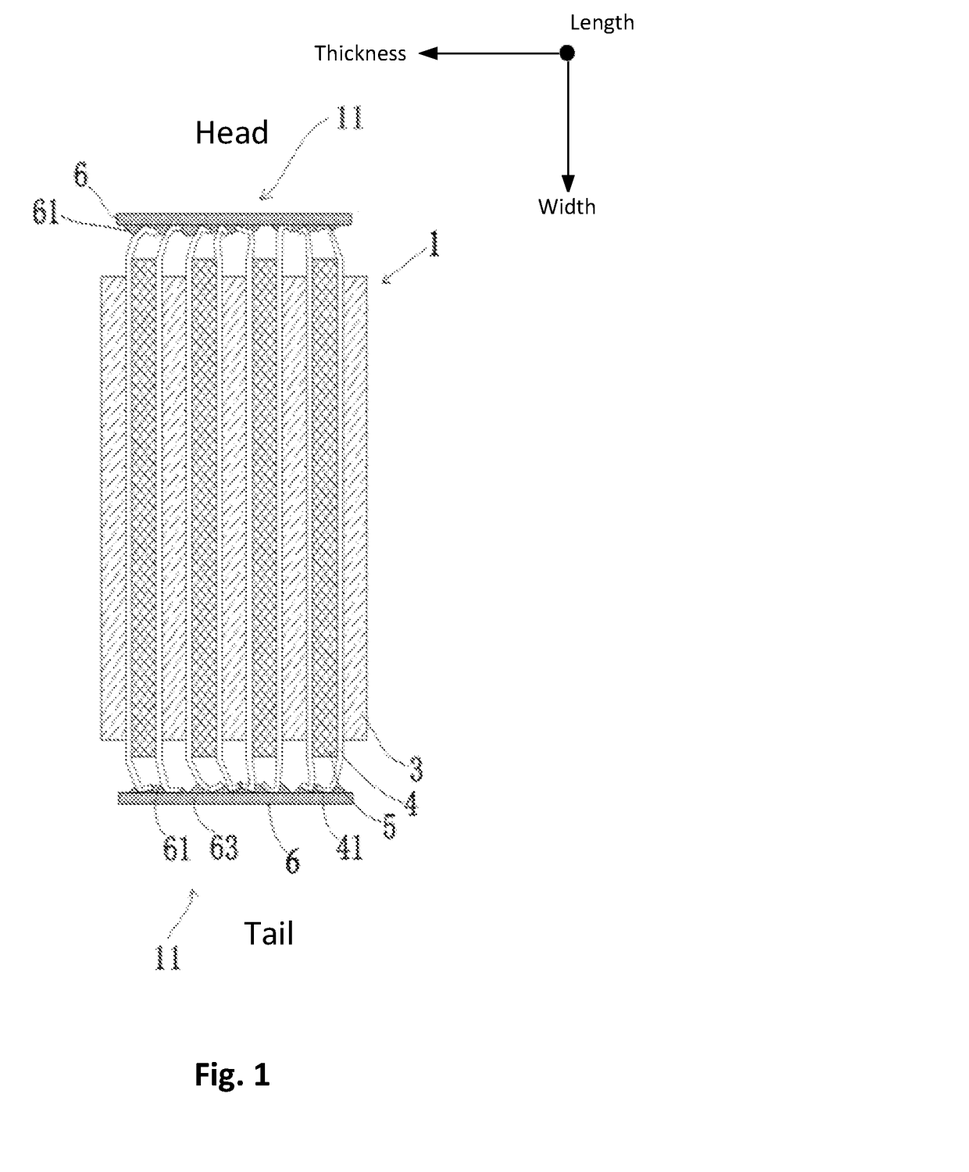
FIG. 1 is a cross-sectional view of a battery cell according to an embodiment of the present application.

With reference to FIG. 1, the present application provides a battery cell 1 including: a negative electrode 3, a positive electrode 5, and a separator 4 arranged between the negative electrode 3 and the positive electrode 5; an end portion 11, the separator 4 having an extension portion 41 beyond the negative electrode 3 and the positive electrode 5 at the end portion 11; an adhesive layer 6 having a body 63 adhered to the extension portion 41 and a connecting portion 61 extending from the body 63, the connecting portion 61 being adhered to the extension portion 41. The end portion 11 of the battery cell 1 may be the head, the tail, and the side of the battery cell 1.

After the battery cell of the present application is adhered to the adhesive layer 6 on the outer side of the end portion 11 of the battery cell 1, in the conventional baking process and chemical formation process for forming a battery, the adhesive layer 6 may soften and creep, a certain proportion of the colloid may evenly overflow along the extension portion 41 of the separator, and the body 63 of the adhesive layer may be still present outside the end portion 11 of the battery cell 1. After cooling and solidifying, the extension portions 41 of the adjacent separators are tightly adhered with each other by the connecting portion 61 formed by a colloid overflowing the surface, and the extension portions 41 of separators of different parts are adhered together as a whole by the body 63. Then, the integrity of the battery cell 1 is enhanced while effectively restricting the extension portion of the separator 4, and looseness is less likely to occur between the electrodes. When the battery cell thus obtained is subjected to a drop test, the edge of the separator does not shrink due to a large restricting force, thereby avoiding a short circuit caused by the contact of the positive and negative electrodes. It will be appreciated that the battery cell herein may be an electrode assembly that does not generally include a housing in the battery industry. That is, when the extension portion 41 protrudes from the positive and negative electrodes 3, 5, the bending direction thereof becomes natural, random, and omnidirectional without fixing the bending direction of the extension portion 41 to the same direction and completely covering the entire end of the bare battery cell (e.g., the head) by heat treatment shaping, thereby avoiding the damage on the separator and the active material near the heat treatment area. At the same time, the softening temperature of the adhesive layer is much lower than the melting temperature of the separator material, and the adhesive layer has a fixed shape at room temperature, thereby reducing the process difficulty. Further, the extension portion 41 is a portion where the separator 4 protrudes from between the positive and negative electrodes 3, 5. The connecting portion 61 is closely connected to the surface of the extension portion 41.

With continuous reference to FIG. 1, in an embodiment, the battery cell 1 includes a plurality of separators 4, and each adjacent two layers of separators 4 are spaced apart by the positive electrode 3 or the negative electrode 5, wherein at the end portion 11 (e.g., the head or the tail) of the battery cell 1, at least the extension portions 41 of the adjacent two layers of the separators 4 are adhered together by the adhesive layer 6. In this way, the extension portions 41 of a plurality of separators 4 may be effectively restricted, and the separator shrinkage does not occur in the drop test, therefore, the invalidation resulted from short circuit caused by the exposure of the positive and negative electrodes is avoided, thereby improving the pass rate of the battery cell drop test.

With reference to FIGS. 2 to 3 and FIGS. 5 to 6, in these embodiments, on the same side of the battery cell 1, all of the extension portions 41 of the separator 4 of the battery cell 1 are adhered together by one adhesive layer 6. In other words, there is only one continuous adhesive layer 6 on the same side of the battery cell 1. This continuous adhesive layer 6 joins all of the extension portions 41 of the separator 4 together to form a unitary body, thereby maximally preventing invalidation resulted from short circuit caused by shrinkage of the separator. It should be understood that if the adhesive layer 6 is adhered to the head of the battery cell, the electrode tabs should be prevented from being adhered.

Figure 4:
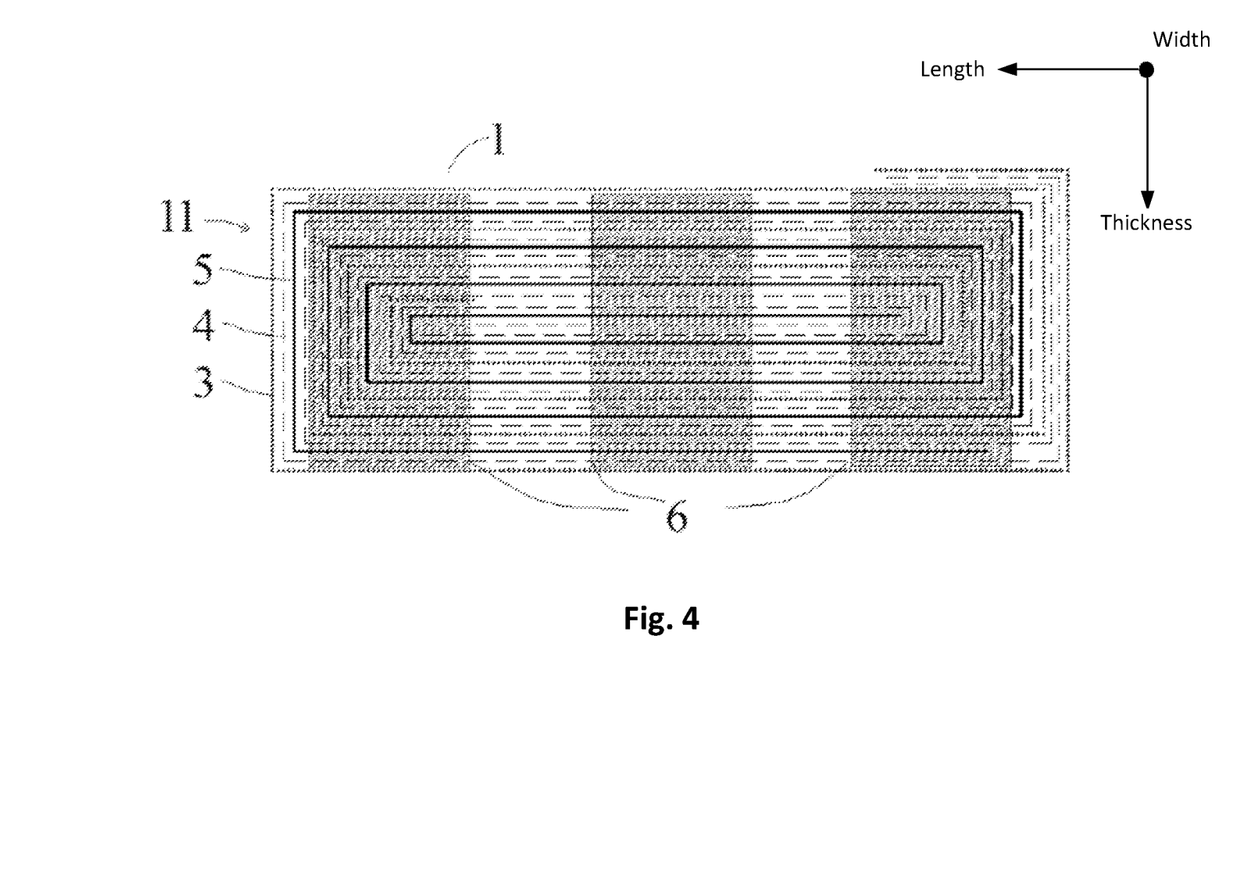
FIG. 4 is a bottom view of an embodiment of the electrochemical device of the present application.
Figure 5:
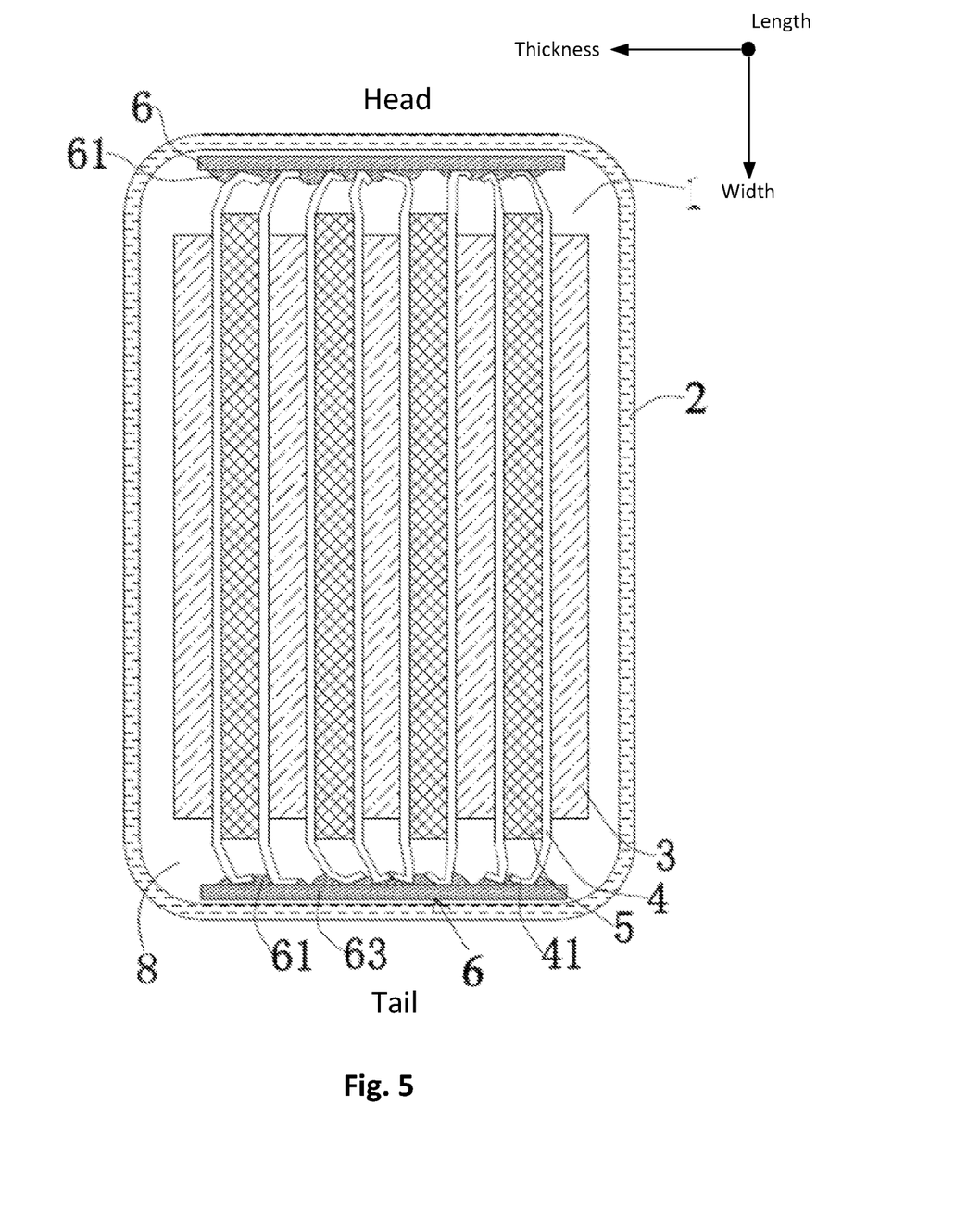
FIG. 5 is a cross-sectional view of an embodiment of the electrochemical device of the present application.
Figure 6:
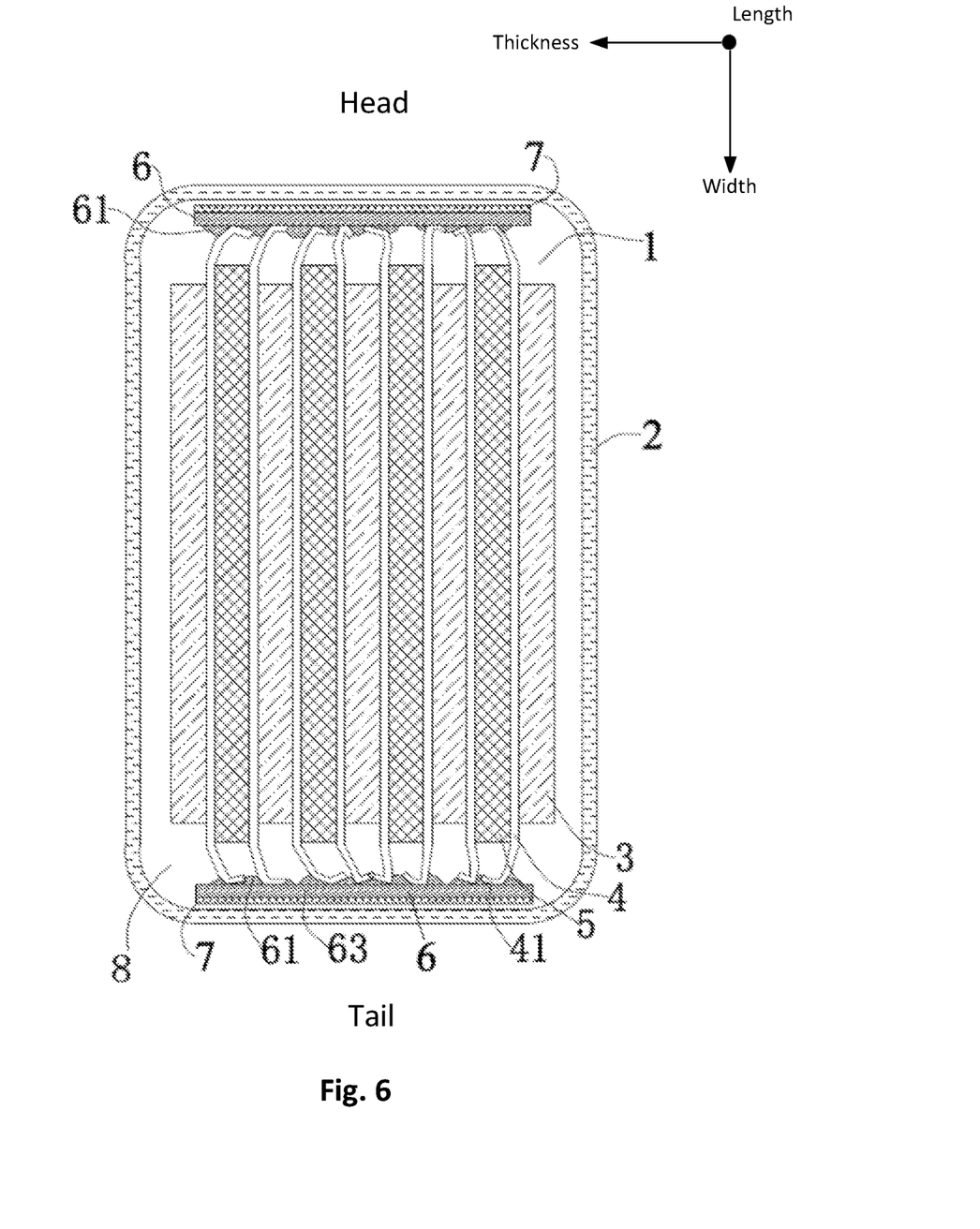
FIG. 6 is a cross-sectional view of an embodiment of the electrochemical device of the present application.

With reference to FIG. 4, in an embodiment, a plurality of the adhesive layers 6 are spaced apart at the end portion 11. Among those, each segment of the adhesive layers 6 is connected to the extension portions 41 of at least two adjacent separators 4. In other words, in the length direction of the battery cell 1 (i.e., in the left-right direction in FIG. 4), the adhesive layer 6 may be adhered from two, three or even more segments thereof with appropriate gaps between each segment to ensure electrolyte infiltration. It should also be understood that the segmentation of the adhesive layer may also be performed in the thickness direction of the battery cell 1 (i.e., in the up-down direction in FIG. 4), and each segment of the adhesive layer at least achieves the connection of the separator extension portion of the part it covers.

The connecting portion 61 and the body 63 are an integral piece of the same hot melt material. The compositions of the hot melt material forming the connecting portion 61 and the body 63 of the separator may include, but not limited to one or more of ethylene-vinyl acetate copolymer, random polyolefin, polyamide, polyurethane, polyethylene, polyacrylic acid, organic silicone, polyvinyl alcohol, epoxy resin, and styrene butadiene rubber.

With reference to FIGS. 1 to 6, in an embodiment, the body 63 of the adhesive layer extends straight along the direction in which the end face of the end portion 11 extend. Specifically, the body 63 of the adhesive layer is a structure similar to a flat plate, and its surface softens and creeps when heated. However, its inner core is still maintained as a solid with a certain hardness, maintaining a substantially flat state, without directly applying the molten glue to the extension portion 41 of the separator. The body 63 of the adhesive layer may conform to the shape of the extension portion 41 of the separator. This further strengthens the restriction to the edge of the separator. When the battery cell 1 has only one layer of the separator 4, the edge of the separator 4 may also be prevented from shrinking between the positive and negative electrodes, thereby preventing the positive and negative electrodes from being exposed to cause a short circuit.

Further, exemplarily, the adhesive layer 6 has a thickness of 10 to 300 um, and preferably has a thickness of 50 to 150 um. The internal structure of the adhesive layer 6 is one or more of a dense structure, a porous structure, or a grid structure.

With continuous reference to FIGS. 1 to 6, in an embodiment, the dimension of the adhesive layer 6 is equal to or less than the dimension of the end face of the battery cell (e.g., the dimension of the head or the end face of the tail). That is, the length of the adhesive layer 6 is equal to or less than the width of the battery cell 1 (the width in the direction perpendicular to the plane of the drawings), and the width of the adhesive layer 6 is equal to or less than the thickness of the battery cell (the width in the left-right direction in the plane of the drawings). It should be understood that the dimension of the adhesive layer 6 may not be greatly less than the dimension of the end face of the battery cell, but close to the end face dimension of the battery cell.

With continuous reference to FIGS. 1 to 6, in an embodiment, the dimension of the adhesive layer 6 is equal to or less than the dimension of the end face of the battery cell (e.g., the dimension of the head or the end face of the tail). That is, the length of the adhesive layer 6 is equal to or less than the length of the battery cell 1 (i.e., the dimension in the direction perpendicular to the plane of FIG. 1), and the width of the adhesive layer 6 is equal to or less than the thickness of the battery cell (i.e., the dimension in the left-right direction in the plane of FIG. 1). It should be understood that the dimension of the adhesive layer 6 may not be greatly less than the dimension of the end face of the battery cell, but close to the end face dimension of the battery cell.

For example, the battery cell of the present application may be a battery cell of a lithium battery.

With reference to FIGS. 2 to 5, the present application further provides an electrochemical device including: a housing 2; an electrolyte 8 contained in the housing 2; and the battery cell mentioned in above embodiments arranged in the housing 2. In this case, the adhesive layer 6 of the battery cell may further includes a fixing portion 62 which extends from the body 63 of the adhesive layer 6 and binds the housing 2. In the conventional baking process and chemical formation process for forming a battery, the adhesive layer 6 may soften and creep, and may overflow the inner surface of the tail or head of the corresponding housing 2 while evenly overflowing along the extension portion 41 of the separator to firmly bind the battery cell 1 and the housing 2 into one body, so that the relative movement of the two is greatly reduced and the damage caused by the impact of the battery cell 1 on the housing 2 is improved. Therefore, the pass rate for battery cell drop test may be further improved.

The present application further provides a method of manufacturing the electrochemical device including the housing 2 and the battery cell 1. The battery cell 1 includes the end portion 11, the separator having an extension portion 4 beyond the negative electrode 3 and the positive electrode 5 at the end portion 11. The method includes steps of:

arranging the adhesive layer 6 on the end portion 11;
placing the battery cell 1 in the housing 2;
heating the electrochemical device.

Figure 7:
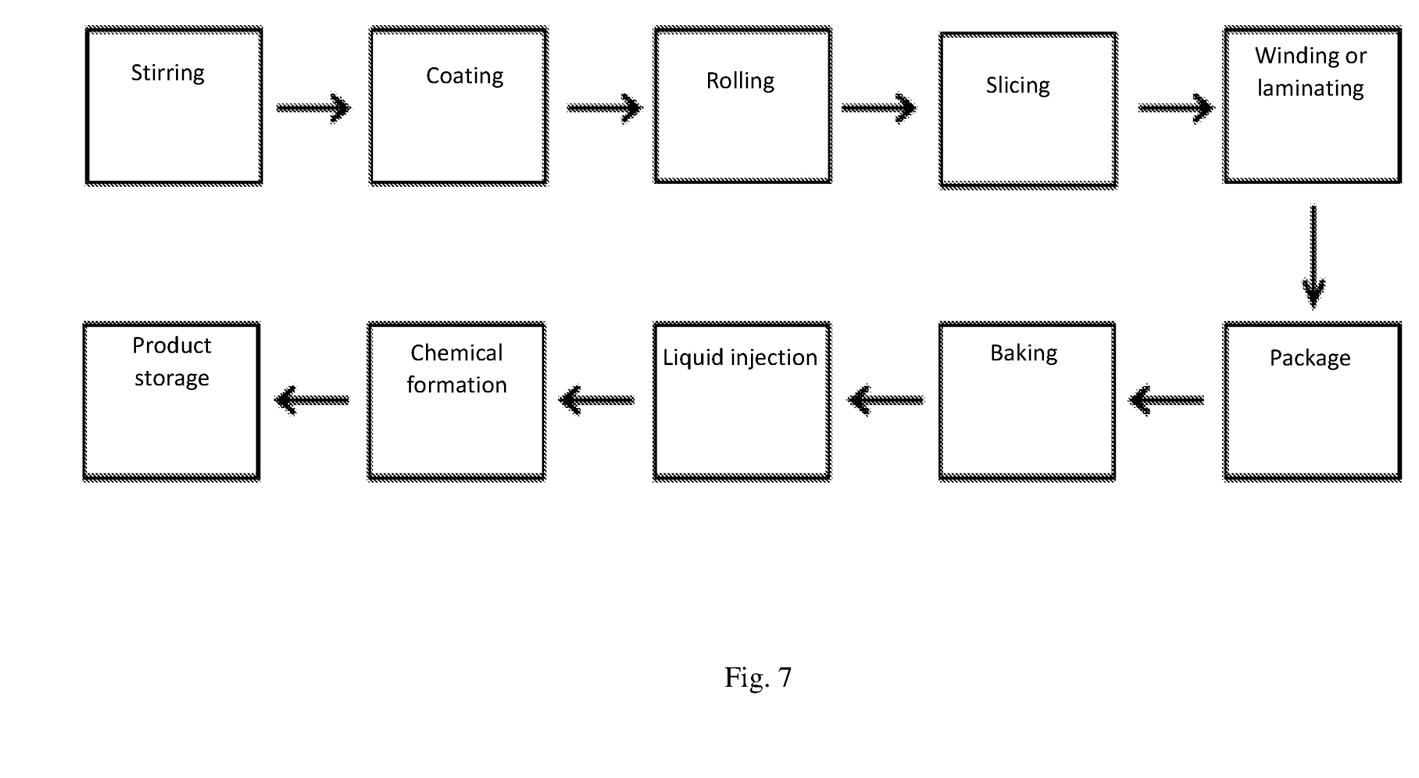
FIG. 7 is a flow chart of a process for manufacturing an electrochemical device according to an embodiment of the present application.

Among them, in the process of heating the electrochemical device, the battery cell 1 to which the adhesive layer 6 is adhered is heated twice, wherein the first heating is performed in the baking step, and the second heating is performed in the chemical forming step. Wherein the battery cell of the present application is formed after the second heating, and the connecting portion 61 is formed by overflowing from the body 63 of the adhesive layer. The temperature of the baking step may be 60 to 90° C., and the temperature of the formation step may be 50 to 100° C. The present application places the adhesive layer to be heated in a conventional step of manufacturing a lithium battery (such as a baking step and a formation step) and heats the adhesive layer by the heat from manufacturing the lithium battery instead of melting the adhesive layer at a high temperature in advance in the prior art, and/or the extension portion of the separator is shaped at a high temperature. It eliminates the need for additional heating steps or heat, saves process and cost, and achieves a good pass rate in the drop test. The embodiments of the present application may manufacture a lithium battery by using a process flow for manufacturing a lithium battery commonly used in the art as shown in FIG. 7. of course, embodiments of the present application may make reasonable modifications and adjustments thereto.

Before the adhesive layer 6 is placed on the end portion 11, the adhesive layer 6 is appropriately heated to increase the surface stickiness of the adhesive layer 6 with a heating temperature that may be between 50 and 100° C. so as to adhere to the end of the battery cell easily.

For convenient transportation and storage, one side or both sides of the adhesive layer 6 contain a release paper, and the release paper is peeled off before the adhesive layer 6 is adhered to the end portion 11 of the battery cell 1. Specifically, one side of the adhesive layer may contain a layer of release paper, or both sides of the adhesive layer may contain a layer of release paper respectively. The release paper may be removed before or after the adhesive layer is applied (in the case of a single-sided release paper).

Taking the drop test for secondary battery as an example, the following embodiments and comparative examples further explain the drop safety performance of the soft pack battery improved by the package of the adhesive layer.

The drop test process in the present application specifically contains steps as follows:

fixing the secondary battery in a specific fixture, wherein the secondary battery used for the drop test is semi-charged;

dropping the battery-mounted fixture from the position of 1.0 m in height to the concrete floor, wherein the dropping may include the dropping of the six surfaces and four corners of the battery respectively; and, the dropping is repeated for 5 rounds. The voltage drop is recorded before and after the test, and disassembling is performed after the test to observe and analyze the phenomenon of separator shrinkage.

Embodiment 1

Figure 2:
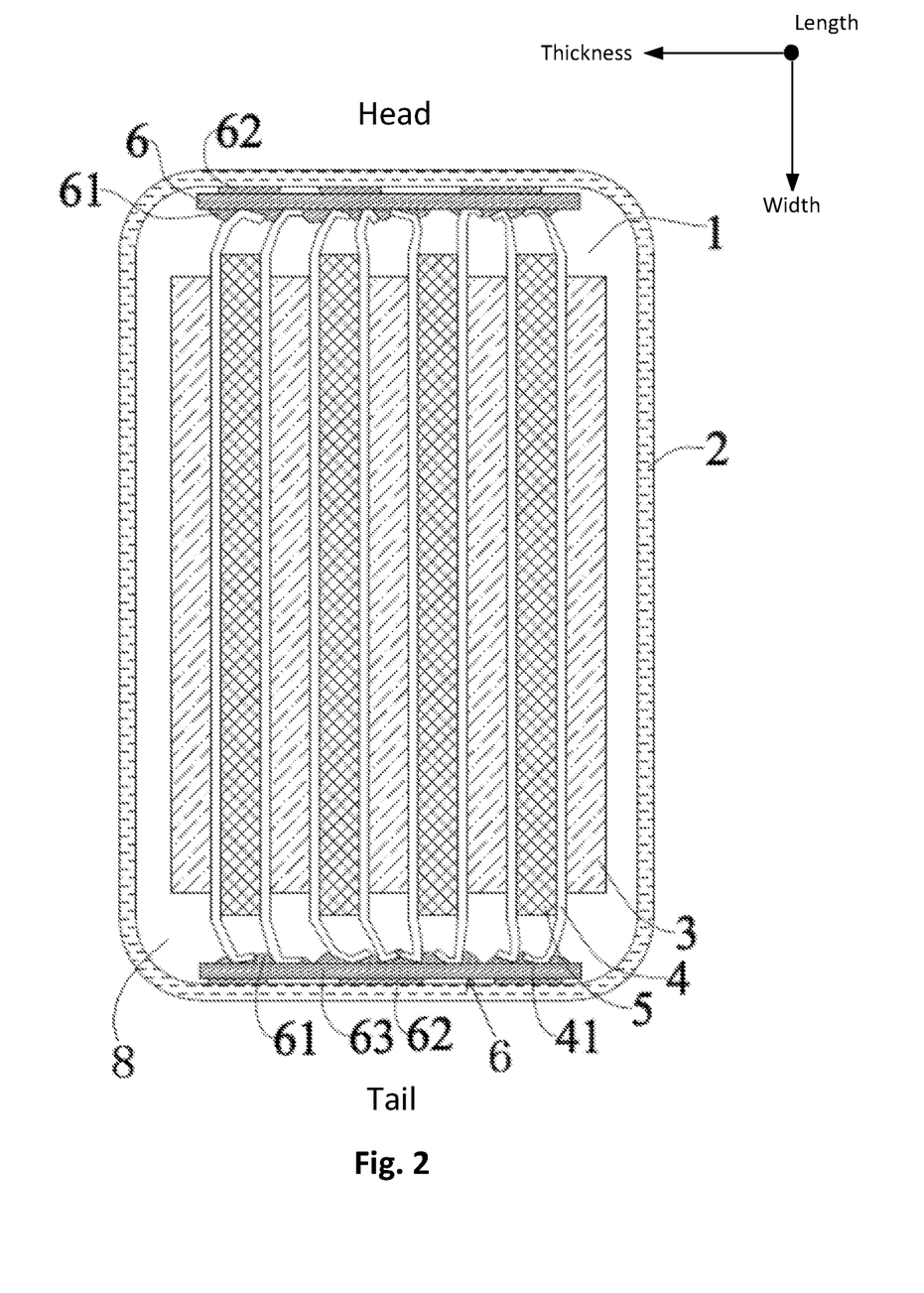
FIG. 2 is a cross-sectional view of an embodiment of the electrochemical device of the present application.
Figure 3:
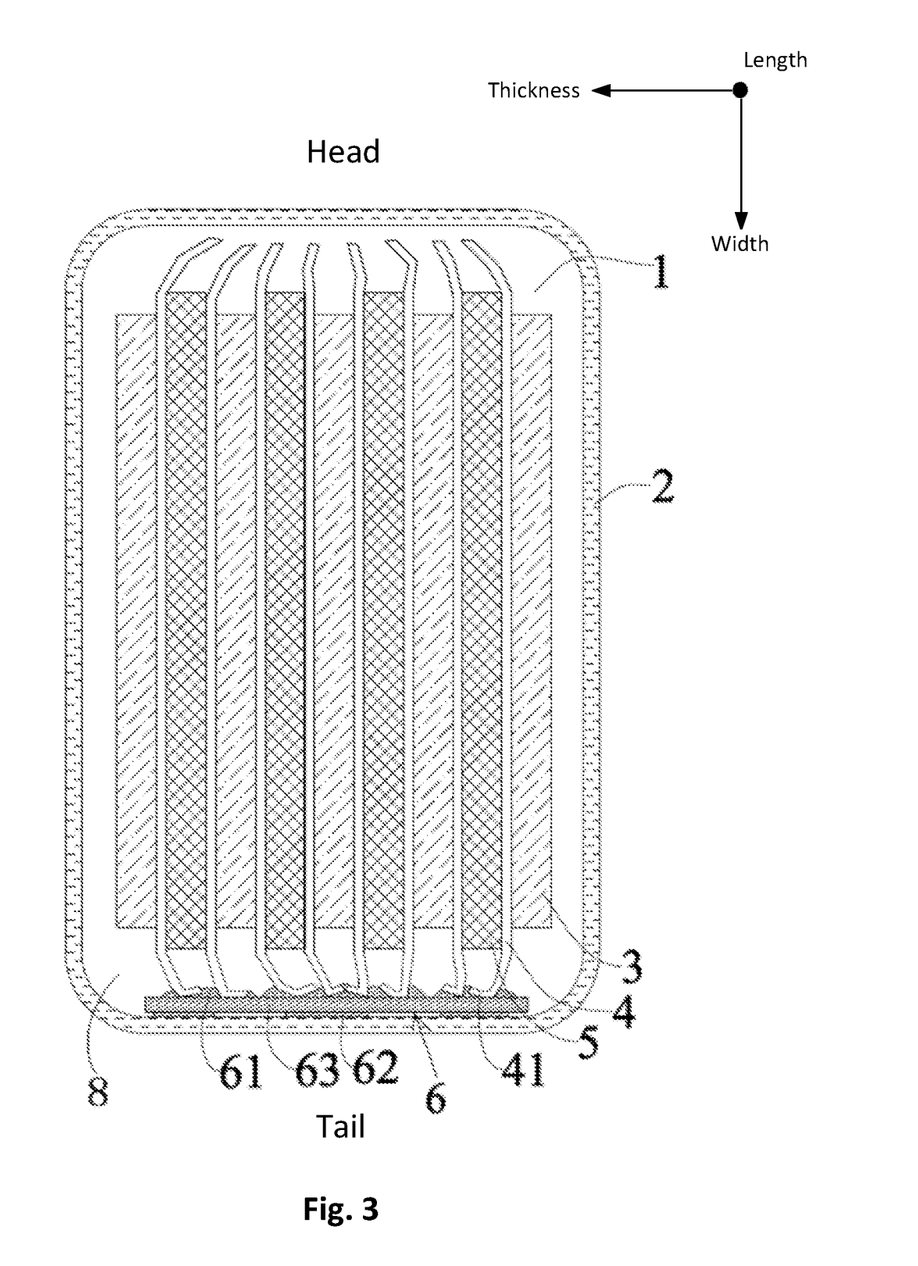
FIG. 3 is a cross-sectional view of an embodiment of the electrochemical device of the present application.

With reference to FIG. 2, the battery cell 1 is obtained by winding or laminating so that the positive electrode 5 and the negative electrode 3 are alternately arranged, and both ends of the positive electrode protrude 0.2-1 mm beyond the negative electrode respectively. There is a layer of polyolefin separator 4 arranged between the positive electrode 5 and the negative electrode 3, wherein both ends of the separator 4 protrude 0.2 to 2 mm beyond the positive electrode respectively. The adhesive layer 6 is cut into an elongated strip shape having a length close to but not exceeding the length of the battery cell 1 (i.e., the dimension in the direction perpendicular to the plane of FIG. 2), and a width close to but not exceeding the thickness of the battery cell 1 (i.e., the dimension in the left-right direction in the plane of FIG. 2). The adhesive layer 6 is adhered to both ends, i.e., the head and the tail, of the battery cell 1 by manual operation or an automatic device, and is in direct contact with the edge of the separator exposed at the end. The position of the adhesive layer 6 requires to be controlled more accurately, so as not to exceed the dimension of the end face of the battery cell as much as possible. Before bonding the adhesive layer 6, if necessary, it is necessary to heat it at an appropriate temperature to increase the surface stickiness for easy adhesion to the end portion of the battery cell. The battery cell 1 to which the adhesive layer 6 is bonded at both ends of the head and the tail is produced in accordance with the manufacturing process of the secondary battery, that is, the battery cell is sealed in the housing 2, and assembled into a secondary battery through post procedures such as liquid injection, chemical formation, etc. Among them, the vacuum baking temperature before liquid injection is controlled within the range of 60 to 90.degree. C., and the temperature of chemical formation after liquid injection is controlled within the range of 50 to 100.degree. C. The high temperature in the two steps of vacuum baking and chemical formation enables the adhesive layer 6 to soften and creep, so that the adhesive layer 6 overflows in a certain distance. The overflowing is in a form of contacting. The colloid on the surface of the adhesive layer 6 at the junction with the edge of the separator 4 is uniformly diffused along the edge of the separator 4 to the gaps between the edges of the separators under the effect of internal creeping at a high temperature. The colloid overflowing between the edges of the separator forms the connecting portion 61, which maintains a good bond with the body of the adhesive layer 6, while bonding the parts of the separator edges of the different layers that are adjacent to each other. Therefore, the edges of the separator at the entire end portion may be effectively bonded into a tight whole through the adhesive layer 6 and the connecting portion 61 produced therefrom, and the mutual restriction is greatly enhanced. In addition, the adhesive layer 6 may also form a fixing portion 62 through overflowing to the inner surface of the housing at a high temperature, so that the battery cell 1 and the housing 2 are bonded together to reduce the mutual movement of the battery cell and the housing during the falling process and to reduce the damage of the housing 2 caused by the impact from the battery cell. After the lithium battery is manufactured, the drop test is carried out according to the standard method.

Different from Embodiment 1, in the Comparative Example, there is no adhesive layer at the end of the battery cell while other manufacturing processes and conditions remaining consistent.

The voltage change is recorded before and after the battery cell falls, the appearance of the battery cell is checked after the falling, and the electrodes are disassembled and unfolded to observe the contraction of the separator. Compared with the battery in Embodiment, the battery cell whose head and tail ends are sealed by the adhesive layer may not be short-circuited by the separator shrinkage during the falling process due to effective restriction on the edges of the separator. Therefore, the probability of contraction of the separator at the head and tail ends is reduced from 3/10 and 6/10 to 0/10, respectively. At the same time, since the end of the battery cell is adhered to the housing to be a whole so as not to undergo violent mutual movement during the falling, the probability of damage to the housing is reduced from 2/10 to 0/10. Therefore, the pass rate of drop test for the battery cell of Embodiment 1 is significantly increased from a lower level of 3/10 to an ideal level of 10/10 as shown in Table 1.

TABLE 1

| Category | Test amount | Pass rate (ΔOCV < 10 mV) | Contraction of separator at the head | Contraction of separator at the tail | Damage of housing |
|---|---|---|---|---|---|
| Comparative Examples | 10 | 3/10 | 3/10 | 6/10 | 2/10 |
| Embodiment 1 | 10 | 10/10 | 0/10 | 0/10 | 0/10 |

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery cell in a housing, comprising:
   a first electrode, a second electrode, and a separator disposed therebetween, wherein the separator comprises an extension portion beyond the first electrode and the second electrode at an end portion of the battery cell, the extension portion includes a plurality of bending pieces; and
   an adhesive layer comprising a body and a connecting portion extending from the body toward the extension portion and a fixing portion extending from the body bound to an inner surface of the housing, wherein the body and the connecting portion are directly adhered to the plurality of bending pieces of the extension portion, and the adhesive layer including the body, the connecting portion, and the fixing portion is an integral piece.

2. The battery cell according to claim 1, wherein the adhesive layer comprises a plurality of adhesive layer units positioned at intervals on the end portion.

3. The battery cell according to claim 1, wherein the adhesive layer comprises at least one of ethylene-vinyl acetate copolymer, random polyolefin, polyamide, polyurethane, polyethylene, polyacrylic acid, organic silicone, polyvinyl alcohol, epoxy resin, styrene butadiene rubber.

4. The battery cell according to claim 1, wherein the adhesive layer has a thickness of 10 to 300 um.

5. The battery cell according to claim 4, wherein the adhesive layer has a thickness of 50 to 150 um.

6. The battery cell according to claim 1, wherein the adhesive layer has a porous structure inside.

7. An electrochemical device, comprising:
   a housing;
   an electrolyte contained in the housing; and
   a battery cell arranged in the housing, wherein the battery cell comprises:
      a first electrode, a second electrode, and a separator disposed therebetween, wherein the separator comprises an extension portion beyond the first electrode and the second electrode at an end portion of the battery cell, the extension portion includes a plurality of bending pieces; and
      an adhesive layer comprising a body and a connecting portion extending from the body toward the extension portion and a fixing portion extending from the body bound to an inner surface of the housing, wherein the body and the connecting portion are directly adhered to the plurality of bending pieces of the extension portion, and the adhesive layer including the body, the connecting portion, and the fixing portion is an integral piece.

8. The electrochemical device according to claim 7, wherein the adhesive layer comprises a plurality of adhesive layer units positioned at intervals on the end portion.

9. The electrochemical device according to claim 7, wherein the adhesive layer comprises at least one of ethylene-vinyl acetate copolymer, random polyolefin, polyamide, polyurethane, polyethylene, polyacrylic acid, organic silicone, polyvinyl alcohol, epoxy resin, styrene butadiene rubber.

10. The electrochemical device according to claim 7, wherein the adhesive layer has a thickness of 10 to 300 um.

11. The electrochemical device according to claim 10, wherein the adhesive layer has a thickness of 50 to 150 um.

12. The electrochemical device according to claim 7, wherein the adhesive layer has a porous structure inside.

13. The battery cell according to claim 1, wherein the plurality of bending pieces have random bending directions.

* * * * *